(12) United States Patent
Lindsay et al.

(10) Patent No.: US 6,526,125 B1
(45) Date of Patent: Feb. 25, 2003

(54) SYSTEM AND METHOD FOR AUTOMATIC LOCATION IDENTIFICATION DISCREPANCY NOTIFICATION

(75) Inventors: Thomas J. Lindsay, East Calais, VT (US); Christopher Fairol Robbins, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/458,499

(22) Filed: Dec. 11, 1999

(51) Int. Cl.[7] .............................................. H04M 11/04
(52) U.S. Cl. ........................ 379/45; 379/49; 379/93.25
(58) Field of Search ........................ 379/45, 49, 93.25, 379/93.17, 265.01, 265.02, 265.03, 265.04, 266.01, 266.02, 266.06, 266.07

(56) References Cited

U.S. PATENT DOCUMENTS

| | | | | |
|---|---|---|---|---|
| 5,867,559 A | * | 2/1999 | Jorgensen et al. | 379/265.09 |
| 5,963,635 A | * | 10/1999 | Szlam et al. | 379/266.06 |
| 6,363,138 B1 | * | 2/2002 | Aprile | 379/45 |

FOREIGN PATENT DOCUMENTS

| | | | | |
|---|---|---|---|---|
| JP | 411143936 A | * | 5/1999 | G06F/17/60 |

* cited by examiner

Primary Examiner—Melur Ramakrishnaiah
(74) Attorney, Agent, or Firm—Donald D. Mondul

(57) ABSTRACT

A system for electronic correction and notification of discrepancies relating to automatic location identification information in a telephone environment comprising an initiating means for an operator to engage the system; a correction entry means for entering corrected information; and a dissemination means for disseminating the corrected information to recipients. The initiating means is connected with the telephone environment at an operator location having access to stored location identification information. The correction entry means is connected with the initiating means and includes an information entry means. The correction entry means responds to an initiation signal from the initiation means to receive correction information from the information entry means. The correction information is applied to update the stored location information at the operator location. The dissemination means is connected with the correction entry means, receives the correction information and disseminates the correction information to recipients. The method includes the steps of (a) receiving a call from a telephone user; (b) providing stored location identification information pertinent to the user using a computing device as displayed identification information; (c) an operator conferring with the user to verify accuracy of the displayed identification information; (d) if discrepancies are identified in the displayed identification information, the operator engaging a correction entry display with the computing device; (e) the operator entering correcting information in the correction entry display; (f) correcting the discrepancies using the correcting information; and (g) disseminating notice of the correcting to recipients.

18 Claims, 2 Drawing Sheets

SYSTEM AND METHOD FOR AUTOMATIC LOCATION IDENTIFICATION DISCREPANCY NOTIFICATION

BACKGROUND OF THE INVENTION

The present invention is directed to communication systems having a capability to recognize calling parties and automatically display location or other information regarding the calling party to inform the called party. The present invention is especially directed to public safety telephone systems, such as 911 systems, that automatically display calling party location information to a called party at a Public Safety Answering Point (PSAP).

With presently existing public safety telephone systems (e.g., 911 systems), when a call is received at a Public Safety Answering Point (PSAP) such as a police or fire department facility, the telephone number of the calling party is employed to retrieve Automatic Location Information (ALI) in the form of an ALI record from a data base provider. Data base providers are usually local telephone service providers. Sometimes the information in the ALI database does not match information provided verbally by the calling party to the PSAP operator. Presently when this discrepancy occurs, the PSAP operator must fill in an off-line form, such as a paper form, and send it (e.g., via facsimile or mail) to the data base provider in order that the data base provider may update, or correct, its data base information.

There is a need for a simpler procedure for updating Automatic Location Information (ALI) data base information when discrepancies in ALI records are discovered.

SUMMARY OF THE INVENTION

A system for electronic correction and notification of discrepancies relating to automatic location identification information in a telephone environment comprises at least one initiating means for at least one system operator to engage the system; a correction entry means for entering corrected information; and a dissemination means for disseminating the corrected information to predetermined recipients. The at least one initiating means is connected with the telephone environment at at least one operator location. The at least one operator location has access to stored location identification information. The correction entry means is connected with the at least one initiating means and includes at least one information entry means at the at least one operator location. The correction entry means responds to an initiation signal from the at least one initiation means to operate to receive correction information from the at least one information entry means. The correction information is applied to update the stored location information at the at least one operator location. The dissemination means is connected with at least one of the at least one initiating means and the correction entry means. The dissemination means receives the correction information and disseminates the correction information to predetermined recipients.

The method for electronic correction and notification of discrepancies relating to automatic location identification information in a telephone environment comprises the steps of: (a) receiving a call from a telephone user in a service employing the automatic location identification information; (b) providing the automatic location identification information pertinent to the user in a display associated with a computing device as displayed pertinent location identification information; and (c) an operator conferring with the user to verify accuracy of the displayed pertinent location identification information. The method preferably continues with the steps of: (d) if discrepancies are identified in the displayed pertinent location identification information, the operator engaging a correction entry display associated with the computing device; (e) the operator entering correcting information in the correction entry display; (f) correcting the discrepancies using the correcting information; and (g) disseminating notice of the correcting to predetermined recipients.

The system and method of the present invention significantly simplify the Public Safety Answering Point (PSAP) operator's actions required to implement correcting updates to Automatic Location Information (ALI) records.

It is, therefore, an object of the present invention to provide a system and method for correction and notification of discrepancies relating to automatic location identification information in a telephone environment which is simpler to implement than presently existing systems or methods.

It is a further object of the present invention to provide a system and method for correction and notification of discrepancies relating to automatic location identification information in a telephone environment which is implemented on-line with a related computing device.

It is still a further object of the present invention to provide a system and method for correction and notification of discrepancies relating to automatic location identification information; in a telephone environment which effects automatic notification of information changes to predetermined recipients.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
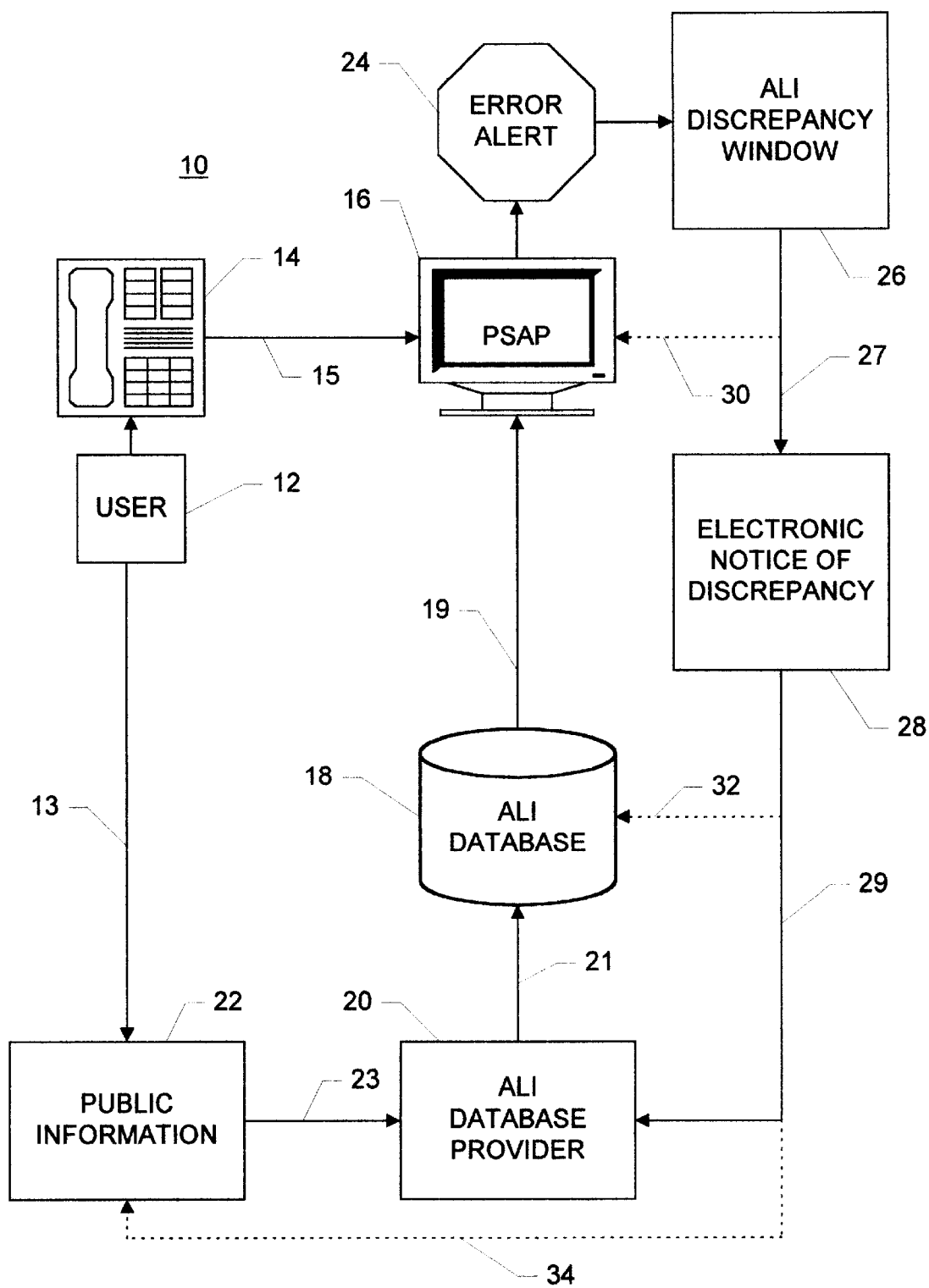
FIG. 1 is a schematic diagram illustrating the preferred embodiment of the system of the present invention.

FIG. 1 is a schematic diagram illustrating the preferred embodiment of the system of the present invention. In FIG. 1, a public safety telephone system 10 includes a system user 12, such as a telephone subscriber, using a telephone instrument 14 to call a Public Safety Answering Point (PSAP) 16, as indicated by line 15. PSAP 16 includes a display monitor associated with a computing device, such as a personal computer (not shown in detail in FIG. 1), to automatically display location information relating to user 12 at PSAP 16. For example, if telephone system 10 is a 911 emergency call system installed with a public service telephone network, PSAP 16 may be a police or fire department answering center, and location information displayed at PSAP 16 indicates address details for user 12.

Such address information is obtained at PSAP 16 from an Automatic Location Identification (ALI) database 18, as indicated by line 19. ALI database 18 may be stored on-line at PSAP 16, or may be accessed by PSAP 16 remotely via a computer network or other communications arrangement. Most commonly, ALI database 18 is situated at a remote location from PSAP 16 and accessed by PSAP 16 as needed. An ALI database provider 20 provides ALI database 18 for use by PSAP 16, as indicated by line 21. In a remotely located arrangement, ALI database provider 20 stores and maintains information in ALI database 18. Information to populate ALI database 18 is commonly obtained by ALI database provider 20 from public information sources 22, as indicated by line 23. A common public information source 22 is public utility records, such as telephone customer records. Public information sources 22 receive location information from user 12 periodically, as indicated by line 13. There may be discrepancies in location information stored in ALI database 18 because user 12 changed residences, or for other reasons not reflected in public information sources 22 employed by ALI database provider 20 to populate ALI database 18 with location information.

Discrepancies in location information provided by ALI database 18 for PSAP 16 may be discovered by several circumstances. A common circumstance for discovering a discrepancy in information provided by ALI database 18 for PSAP 16 is when an operator at PSAP 16 verbally seeks to confirm with user 12 location information displayed by public safety telephone system 10 at PSAP 16: during conversation with user 12. In the event there is a discrepancy discovered in location information relating to user 12, prior art systems provided that an operator at PSAP 16 fill out a correction form reflecting correction information, and send the correction slip to ALI database provider 20. The sending was usually effected using mail, other hand delivery, or facsimile delivery.

The system of the present invention provides a simpler, more straightforward, way to notify ALI database provider 20 regarding correction information for ALI database 18 that employs advantageous aspects of computer software and data communications technologies.

Using the system of the present invention, on discovering a discrepancy in location information relating to user 12, an operator at PSAP 16 initiates an error alert 24. Error alert 24 may be initiated by any initiating means such as pressing a keyboard key or key sequence, voice command activation, foot switch activation, or any other way of indicating information to a computing apparatus. Preferably, error alert 24 is effected by pressing a predetermined key on a computer keyboard data entry device (not shown in detail in FIG. 1). Initiating error alert 24 automatically effects display of a correction entry means. A correction entry means may include any format of display into which correction information may be entered and captured for later employment for updating, or correcting, information stored in a computing apparatus. Preferably, the correction entry means of the present invention is in the form of an ALI information correction entry display, or ALI discrepancy window 26. ALI discrepancy window 26 provides a simple tool for an operator at PSAP 16 to employ for entering correcting information on-line in a computing device (not shown in detail in FIG. 1) at PSAP 16. The computing device into which correcting information is entered via ALI discrepancy window 26 preferably is the computing device associated with the display device at PSAP 16 that displays ALI discrepancy window 26. ALI discrepancy window 26 is preferably implemented as part of a computer program employed by a computing device at PSAP 26, or at least accessible from PSAP 26. Correction information is entered by an information entry means, which may include a computer keyboard, a voice data entry apparatus, or other data entry apparatuses. The preferred information entry means of the system of the present invention is a keyboard apparatus configured for entering data into a computer apparatus accessible by an operator at the PSAP. Network arrangements known to those skilled in the art of telephone and computer systems may effect other arrangements, if desired. For example, initiation of an error alert 24 by an operator at PSAP 16 may cause ALI discrepancy window 26 to be displayed at another display than the one being used by the operator who initiated error alert 24. In such an arrangement, the administrative burden of entering correction information may be shifted to another operator than the operator initially called who, presumably, must act quickly to handle whatever emergency occasioned the 911 call by user 12. Network arrangements may offer a variety of routines for handling such situations and for incorporating obtaining and entering correction information.

Preferably, ALI discrepancy window 26 is programmed to respond to a simple command by an operator at PSAP 16 to effect electronic notice of discrepancy 28 to provide change information to ALI database provider 20, as indicated by lines 27, 29. Electronic notice of discrepancy 28 may be effected by any of several dissemination means, such as Internet e-mail, intranetwork mail, facsimile, or other electronic notification systems. The preferred dissemination means of the system of the present invention is an automatically disseminated e-mail transmitted via the same access channel used for receiving ALI information from ALI database provider 20. Alternate arrangements may provide that ALI discrepancy window 26 may also be programmed to effect electronic notice of discrepancy 28 to update one or more of an information display at PSAP 16, ALI database 18, and public information source 22 from which erroneous location information was received. The alternative nature of such automatic notification is indicated by notification lines 30, 32, 34 being dotted lines.

Figure 2:
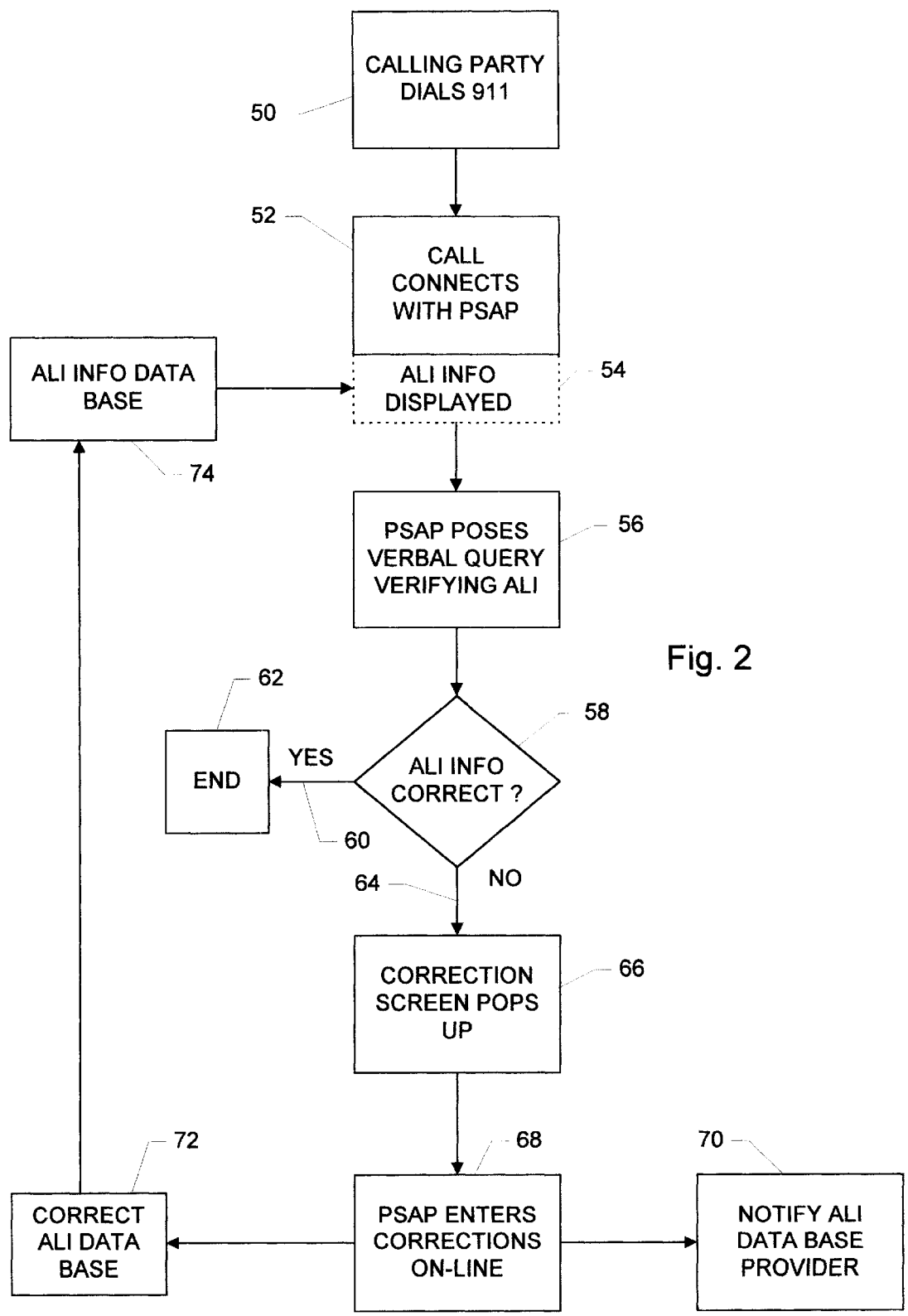
FIG. 2 is a flow diagram illustrating the preferred embodiment of the method of the present invention.

FIG. 2 is a flow diagram illustrating the preferred embodiment of the method of the present invention. In FIG. 2, a method for electronic correction and notification of discrepancies relating to automatic location identification information in a telephone environment (in its preferred embodiment implemented in an emergency call 911 telephone system) begins with a telephone customer calling party dialing 911, as indicated by a block 50. The 911 phone call initiated according to block 50 connects the calling party with a Public Safety Answering Point (PSAP), as indicated by a block 52. A computing apparatus associated with the PSAP displays Automatic Location Identification (ALI) information, as indicated by a dotted line block 54.

The calling party is queried to verify the accuracy of the ALI information displayed at the PSAP. Such querying may be effected using on-line data entry techniques as filling out answers to questions posed in audio or video format transmitted to the calling party, or by other means. Preferably, the query is effected by an operator at the PSAP verbally conversing with the calling party during the 911 phone call to verify accuracy of the ALI information displayed at the PSAP, as indicated by a block 56.

If the ALI information displayed at the PSAP is correct, the method proceeds from a query block 58 via a "YES" response path 60 to end, as indicated by a block 62. If the ALI information displayed at the PSAP requires correction, the method proceeds from query block 58 via a "NO" response path 64. The operator at the PSAP indicates to the computing apparatus associated with the ALI database display at the PSAP that correction of ALI information is required, and an on-line correction screen, or window is displayed for the operator at the PSAP, as indicated by a block 66. The operator at the PSAP enters correction information on-line in the correction screen provided according to block 66, as indicated by a block 68. When ALI information is corrected according to block 68, notification is provided to the ALI database information provider, as indicated by a block 70. Preferably, notification effected according to block 70 is automatically carried out via any or several of various communication media For example, the notification of correction information may be effected using electronic mail (e.g., e-mail via Internet, or intranetwork mail), facsimile communications, or other electronic communications arrangements.

Preferably substantially concurrently with notifying an ALI database information provider of correction information, the correction information may also be used to correct the ALI database, as indicated by a block 72. The ALI information database may be located at the PSAP, or it may be located remotely from the PSAP and electronically accessed by the PSAP. In the event that the ALI database is located at the PSAP, the method of the present invention may continue a further step, as indicated by a block 74, to correct the ALI information and update the display effected according to block 54 presented to the operator at the PSAP.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A system for electronic notification of discrepancies relating to automatic location identification information stored in a location identification data storage facility in a public safety telephone environment; the system comprising:
   (a) an initiating means for a public safety system operator to engage the system;
   (b) a correction entry means for entering corrected information; and
   (c) a dissemination means for disseminating said corrected information to at least one predetermined recipient;
   said initiating means being connected with said public safety telephone environment at a public safety operator location; said public safety operator location having access to said location identification data storage facility; said correction entry means being connected with said initiating means; said correction entry means including an information entry means; said correction entry means responding to an initiation signal from said initiation means to operate to receive correction information from said information entry means; said dissemination means being connected with at least one of said initiating means and said correction entry means; said dissemination means receiving said correction information and effecting said disseminating; said at least one predetermined recipient including at least said location identification data storage facility.

2. A system for electronic notification of discrepancies relating to automatic location identification information stored in a location identification data storage facility in a public safety telephone environment as recited in claim 1 wherein said location identification data storage facility receives information from at least one data source, and wherein said at least one predetermined recipient further includes at least one of said at least one data source.

3. A system for electronic notification of discrepancies relating to automatic location identification information stored in a location identification data storage facility in a public safety telephone environment as recited in claim 1 wherein said disseminating is effected via electronic mail means.

4. A system for electronic notification of discrepancies relating to automatic location identification information stored in a location identification data storage facility in a public safety telephone environment as recited in claim 1 wherein said disseminating is effected via facsimile means.

5. A system for electronic notification of discrepancies relating to automatic location identification information stored in a location identification data storage facility in a public safety telephone environment; the system comprising:
   (a) at least one initiating means for at least one public safety system operator to engage the system;
   (b) a correction entry means for entering corrected information; and
   (c) a dissemination means for disseminating said corrected information to at least one predetermined recipient;
   said at least one initiating means being connected with said public safety telephone environment at at least one public safety operator location; said at least one public safety operator location having access to said location identification data storage facility; said correction entry means being connected with said at least one initiating means; said correction entry means including at least one information entry means at said at least one public safety operator location; said correction entry means responding to an initiation signal from said at least one initiation means to operate to receive correction information from said at least one information entry means; said dissemination means being connected with at least one of said at least one initiating means and said correction entry means; said dissemination means receiving said correction information and effecting said disseminating; said at least one predetermined recipient including at least said location identification data storage facility.

6. A system for electronic notification of discrepancies relating to automatic location identification information stored in a location identification data storage facility in a public safety telephone environment as recited in claim 5 wherein said location identification data storage facility receives information from at least one data source, and wherein said at least one predetermined recipient further includes at least one of said at least one data source.

7. A system for electronic notification of discrepancies relating to automatic location identification information stored in a location identification data storage facility in a public safety telephone environment as recited in claim 5 wherein said disseminating is effected via electronic mail means.

8. A system for electronic notification of discrepancies relating to automatic location identification information stored in a location identification data storage facility in a public safety telephone environment as recited in claim 5 wherein said disseminating is effected via facsimile means.

9. A method for electronic notification of discrepancies relating to automatic location identification information stored in a location identification data storage facility in a public safety telephone environment; the method comprising the steps of:
   (a) receiving a call from a telephone user in a service employing said automatic location identification information;

(b) providing said automatic location identification information pertinent to said user in a display associated with a computing device as displayed pertinent location identification information;

(c) a public safety operator conferring with said user to verify accuracy of said displayed pertinent location identification information;

(d) if discrepancies are identified in said displayed pertinent location identification information, said public safety operator engaging a correction entry display associated with said computing device;

(e) said public safety operator entering correcting information in said correction entry display; and (f) disseminating notice of said correcting to said location identification data storage facility.

10. A method for electronic notification of discrepancies relating to automatic location identification information stored in a location identification data storage facility in a public safety telephone environment as recited in claim 9 wherein the method comprises the further step of correcting said discrepancies using said correcting information; said further step being effected either before step (f), concurrently with step (f), or subsequent to step (f).

11. A method for electronic notification of discrepancies relating to automatic location identification information stored in a location identification data storage facility in a public safety telephone environment as recited in claim 9 wherein said disseminating notice of said correcting comprises disseminating corrected information.

12. A method for electronic notification of discrepancies relating to automatic location identification information stored in a location identification data storage facility in a public safety telephone environment as recited in claim 9 wherein said disseminating notice of said correcting comprises disseminating said correcting information.

13. A method for electronic notification of discrepancies relating to automatic location identification information stored in a location identification data storage facility in a public safety telephone environment as recited in claim 9 wherein said disseminating is effected via electronic mail means.

14. A method for electronic notification of discrepancies relating to automatic location identification information stored in a location identification data storage facility in a public safety telephone environment as recited in claim 9 wherein said disseminating is effected via facsimile means.

15. A method for electronic notification of discrepancies relating to automatic location identification information stored in a location identification data storage facility in a public safety telephone environment as recited in claim 11 wherein said disseminating is effected via electronic mail means.

16. A method for electronic notification of discrepancies relating to automatic location identification information stored in a location identification data storage facility in a public safety telephone environment as recited in claim 12 wherein said disseminating is effected via electronic mail means.

17. A method for electronic notification of discrepancies relating to automatic location identification information stored in a location identification data storage facility in a public safety telephone environment as recited in claim 11 wherein said disseminating is effected via facsimile means.

18. A method for electronic notification of discrepancies relating to automatic location identification information stored in a location identification data storage facility in a public safety telephone environment as recited in claim 12 wherein said disseminating is effected via facsimile means.

* * * * *